United States Patent [19]
Grueninger

[11] Patent Number: 5,967,186
[45] Date of Patent: Oct. 19, 1999

[54] VALVE

[75] Inventor: William Grueninger, Zurich, Switzerland

[73] Assignee: Emhart Glass S.A., Cham, Switzerland

[21] Appl. No.: 09/126,644

[22] Filed: Jul. 31, 1998

[30] Foreign Application Priority Data

Aug. 7, 1997 [GB] United Kingdom .................... 9716624

[51] Int. Cl.[6] ............................ F15B 13/044; F16K 31/11
[52] U.S. Cl. .................. 137/625.65; 251/89; 251/129.03
[58] Field of Search ......................... 137/625.65; 251/89, 251/129.03

[56] References Cited

U.S. PATENT DOCUMENTS 3,236,494  2/1966  Frantz ................................. 251/129.03

*Primary Examiner*—Gerald A. Michalsky
*Attorney, Agent, or Firm*—Spencer T. Smith

[57] ABSTRACT

A solenoid operated pneumatic valve comprises a mechanical latch device movable between three positions, a disabled position, in which an outlet port is connected to exhaust, an enabled position, in which the valve operates normally, and an override position in which the outlet port is connected to a supply of compressed air.

2 Claims, 1 Drawing Sheet

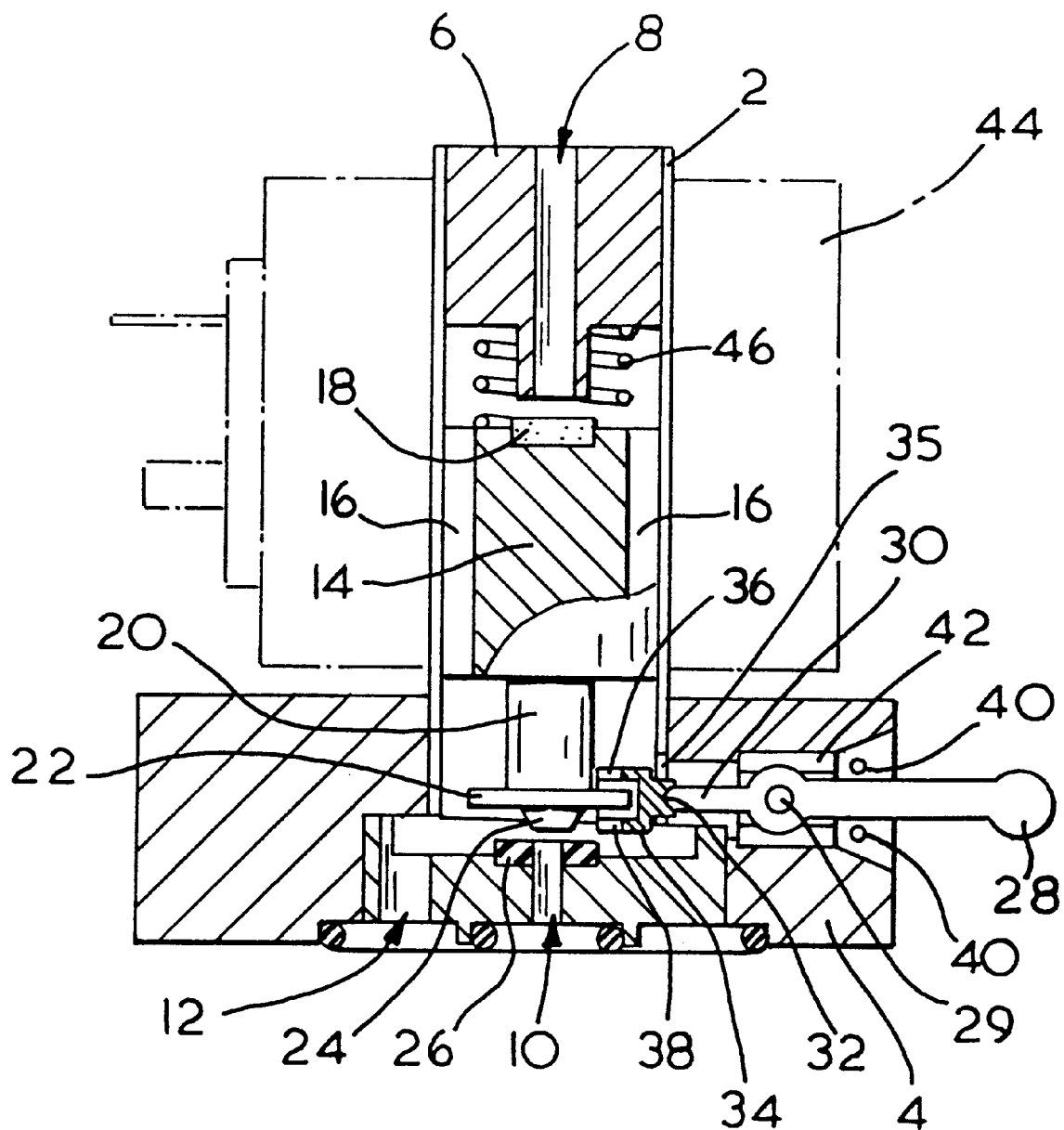

VALVE

This invention is concerned with improvements in pneumatic valves.

BACKGROUND TO THE INVENTION

Conventionally glass container manufacturing machines, as for example the well known I.S. or individual section machine, comprise a number of pneumatically operated mechanisms. Such mechanisms are controlled by numbers of pneumatic operating valves, and conventionally these pneumatic operating valves are arranged in a valve block and are caused to operate by pilot air provided from solenoid operated pneumatic pilot valves in the valve block.

Known solenoid operated pneumatic pilot valves comprise a manual override which, when operated, moves the pilot valve into an open condition and holds it there, overriding electrical actuation of the solenoid, thus ensuring that the associated operating valve is supplied with pilot air and is held in an activated position and the mechanisms thus supplied with compressed air whatever electrical signal is sent to the pilot valve. This is frequently necessary if a mechanism is to be adjusted or repaired. However, if it is desirable to ensure that the mechanism is not supplied with compressed air, should that be the appropriate condition for adjustment or repair, this cannot be achieved through the pilot valve but instead a physical interruption by way of a stop cock must be made in the supply of air to the operating valve. This physical interruption can be time consuming and difficult on occasion depending on the location and accessibility of the stop cock.

It is one of the objects of the present invention to provide a pneumatic valve suitable for use as a pilot valve which may be mechanically locked in both a position in which it supplies air and in a position in which it does not supply air.

BRIEF STATEMENT OF THE INVENTION

The present invention provides a solenoid operated pneumatic valve comprising an inlet port an outlet port an exhaust port a piston movable between an open position in which said inlet port is connected to said outlet port and said exhaust port is closed and a closed position in which said inlet port is closed and said outlet port is connected to said exhaust port a spring urging said piston into one of said open and closed positions a solenoid activation of which urges said piston into the other of said open and closed positions a mechanical latch device movable between a disabled position, in which said piston is held in its said closed position an enabled position, in which said piston is free to move between its said open and its said closed position and an override position, in which said piston is held in its said open position.

Valves according to the invention are particularly advantageous when incorporated in a valve block.

The invention also provides a valve block comprising an array of operating valves each of which is controlled by a pneumatic valve as set out in the last preceding paragraph but one serving as a pilot valve.

DETAILED DESCRIPTION OF THE INVENTION

There now follows a description, to be read with the accompanying drawings, of a valve embodying the invention.

The accompanying drawing shows, somewhat diagrammatically, a solenoid operated pneumatic valve in cross section.

The valve shown in the figure comprises a cylinder 2 which has one end portion seated in a block 4 and its other end portion closed by a cap 6 having a central exhaust port 8. The block 4 comprises an inlet port 10 which is arranged on the axis of the cylinder 2, and an outlet port 12 which is connected to the interior of the cylinder 2.

A soft iron piston 14 is mounted for movement in the cylinder 2 and comprises axial passages 16 through which air can pass. The piston 14 supports a seal 18 towards its end adjacent the cap 6, and an extension 20 towards its end adjacent the block 4. The extension 20 comprises a circumferential flange 22 and a conical seating head 24 which is axially opposite a seal 26 surrounding the inlet port 10.

A mechanical latch device comprises a lever 28 mounted in the block 4 on a pivot 29 and comprising an inner portion 30 having a rounded end which is engaged in a recess 32 of a catch 34 slidably mounted in a slot 35 in the cylinder 2. The catch 34 comprises an upper arm 36 and a lower arm 38 which overlie the flange 22. The block 4 supports three spring detents 40 (only two of which are shown) which engage in a recess (not shown) in the lever 28 to hold the lever in one of three operating positions. The pivot 28 is provided in a sealing block 42 which prevents air passing out from the cylinder 2 to the atmosphere.

Surrounding the cylinder 2 is a solenoid 44. A spring 46 acts between the cap 6 and the piston 14.

As shown in the FIGURE, the lever 28 is in an enabling position, in which the arms 36 and 38 are positioned with respect to the flange 22 so that the piston 14 is free to move between an open (upward viewing the FIGURE) position and a closed (downward viewing the FIGURE) position. The spring 46 serves to urge the piston 14 towards its closed position, in which the seating head 24 engages the seal 26 thus to close the inlet port 10 and the seal 18 is spaced from the exhaust port 8: thus in the closed position the inlet port 10 is closed and the outlet port 12 is connected to the exhaust port 8 through the axial passages 16. Activation of the solenoid 44 causes the piston 14 to move against the spring 46 into its open position, in which the seat 18 seals off the exhaust port 8 and the seating head 24 is moved away from the seal 26 thus to open the inlet port 10 and connect it to the outlet port 12.

When the lever 28 of the latch device is moved downwards (viewing the FIGURE) the latch device is in an override condition in which the arm 38 of the catch 34 engages the flange 22 and holds the piston 14 in its open position against the effect of the spring 46. When the lever 28 is moved upwards the latch device is in a disabling condition in which the arm 36 of the catch 34 engages the flange 22 and holds the piston 14 in its closed condition with the seating 24 head against the seal 26. The detents 40 serve to hold the lever 28 in position once it is moved, and thus activation of the solenoid 44 will have no effect on the piston 14 when the latching device is in its disabling condition.

Valves as just described are particularly advantageous when incorporated in a valve block, particularly a valve block as described in our copending application No GB 9715511,3 in which the valves are provided as pilot valves for an array of operating valves which are all accessible from one face of the valve block, as the fact that each pilot valve can be placed in an override or a disabled condition with easy access simplifies the maintenance and repair of a machine to which the valve block is fitted.

I claim:

1. A solenoid operated pneumatic valve comprising an inlet port an outlet port an exhaust port a piston movable between an open position in which said inlet port is connected to said outlet port and said exhaust port is closed and a closed position in which said inlet port is closed and said outlet port is connected to said exhaust port a spring urging said piston into one of said open and closed positions a solenoid activation of which urges said piston into the other of said open and closed positions a mechanical latch device movable between a disabled position, in which said piston is held in its said closed position an enabled position, in which said piston is free to move between its said open and its said closed position and an override position, in which said piston is held in its said open position.

2. A pneumatic valve according to claim 1 wherein the mechanical latch device comprises a lever detents arranged to hold said lever in one of said disabled, enabled and override positions a catch comprising two arms and movable by said lever a projection on said piston adapted to be engaged by one of the arms when said lever is in its disabled position and by the other of the arms when said lever is in its override position.

* * * * *